United States Patent
Thielert et al.

(10) Patent No.: US 10,435,299 B2
(45) Date of Patent: Oct. 8, 2019

(54) METHOD AND DEVICE FOR PRODUCING SULFURIC ACID

(71) Applicants: THYSSENKRUPP INDUSTRIAL SOLUTIONS AG, Essen (DE); thyssenkrupp AG, Essen (DE)

(72) Inventors: Holger Thielert, Dortmund (DE); Zion Guetta, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/754,436

(22) PCT Filed: Sep. 2, 2016

(86) PCT No.: PCT/EP2016/070760
§ 371 (c)(1),
(2) Date: Feb. 22, 2018

(87) PCT Pub. No.: WO2017/037256
PCT Pub. Date: Mar. 9, 2017

(65) Prior Publication Data
US 2018/0237299 A1    Aug. 23, 2018

(30) Foreign Application Priority Data
Sep. 4, 2015    (DE) .................. 10 2015 114 875

(51) Int. Cl.
C01B 17/54    (2006.01)
C01B 17/74    (2006.01)
(Continued)

(52) U.S. Cl.
CPC .......... *C01B 17/74* (2013.01); *B01D 53/1481* (2013.01); *B01D 53/502* (2013.01);
(Continued)

(58) Field of Classification Search
CPC ......... C01B 17/69; C01B 17/74; C01B 17/76; C01B 17/765; C01B 17/80
See application file for complete search history.

(56) References Cited

U.S. PATENT DOCUMENTS 1,405,669 A * 2/1922 Chase .................... C01B 17/76
                                                    422/160
2,337,060 A * 12/1943 Munson ................ C01B 17/76
                                                    422/161
(Continued)

FOREIGN PATENT DOCUMENTS

EP    0439742 A    8/1991
EP    2042470 A    4/2009
WO    2009060022 A    5/2009

OTHER PUBLICATIONS

English Translation of International Search Report issued in PCT/EP2016/070760, dated Oct. 19, 2016 (dated Oct. 31, 2016).

*Primary Examiner* — Timothy C Vanoy
(74) *Attorney, Agent, or Firm* — thyssenkrupp North America, Inc.

(57) ABSTRACT

A process for preparing sulfuric acid may involve melting elemental sulfur in a melting stage to give molten sulfur. Sulfuric acid is subsequently produced from the molten sulfur. Further, sulfur-containing offgases formed in the melting stage may be subjected to oxidation in a supplementary oxidation stage in which sulfur-containing components of the offgases are oxidized to sulfur dioxide. The process may further involve processing the sulfur dioxide to give at least one reaction product. The melting stage may be operated without emissions by processing all of the offgases from the melting stage. An apparatus may be employed for carrying out such a process.

14 Claims, 1 Drawing Sheet

(51) Int. Cl.
*B01D 53/14* (2006.01)
*B01D 53/50* (2006.01)
*B01J 19/24* (2006.01)
*B01D 53/52* (2006.01)
*C01B 17/02* (2006.01)
*C01B 17/79* (2006.01)

(52) U.S. Cl.
CPC .......... *B01D 53/523* (2013.01); *B01J 19/245* (2013.01); *C01B 17/0221* (2013.01); *C01B 17/0232* (2013.01); *C01B 17/54* (2013.01); *C01B 17/79* (2013.01); *B01D 2251/506* (2013.01); *B01J 2219/24* (2013.01)

(56) References Cited

U.S. PATENT DOCUMENTS

| | | | |
|---|---|---|---|
| 2,520,454 A | | 8/1950 | Carter |
| 2,807,522 A | * | 9/1957 | Russell .................. C01B 17/54 |
| | | | 422/160 |
| 3,443,896 A | | 5/1969 | Furkert |
| 4,123,107 A | * | 10/1978 | Bryant, Jr. ............. C01B 17/69 |
| | | | 299/6 |
| 4,213,958 A | | 7/1980 | Cameron |
| 5,593,652 A | | 1/1997 | Peng |
| 8,916,127 B1 | * | 12/2014 | Chiu ....................... C01B 17/54 |
| | | | 423/522 |
| 2002/0159938 A1 | | 10/2002 | Fenderson |

* cited by examiner

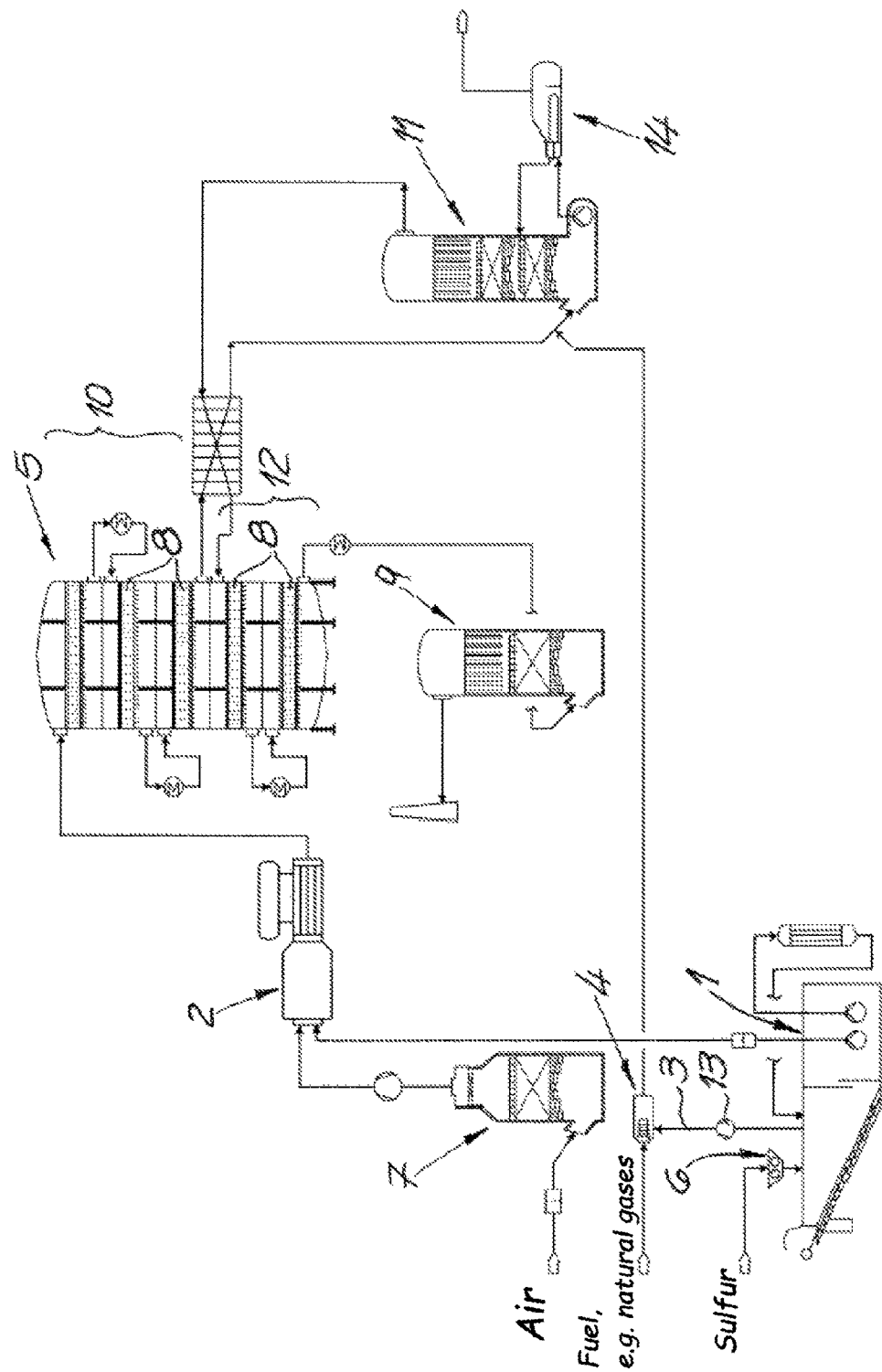

METHOD AND DEVICE FOR PRODUCING SULFURIC ACID

CROSS REFERENCE TO RELATED APPLICATIONS

This application is a U.S. National Stage Entry of International Patent Application Serial Number PCT/EP2016/070760, filed Sep. 2, 2016, which claims priority to German Patent Application No. DE 10 2015 114 875.7, filed Sep. 4, 2015, the entire contents of both of which are incorporated herein by reference.

FIELD

The present disclosure generally relates to sulfuric acid, including processes and devices for preparing sulfuric acid.

BACKGROUND

Processes for preparing sulfuric acid are known in various variants from industrial practice. In the melting of the elemental sulfur in the melting stage, emissions occur in the form of offgases which contain, in particular, sulfur dioxide ($SO_2$), elemental sulfur, hydrogen sulfide ($H_2S$) and water. The elemental sulfur present in these offgases can deposit in the form of undesirable solid impurities on cooling in the plant. Furthermore, the sulfur vapors can ignite and therefore represent an explosion risk. In the past, the offgas emissions have frequently been discharged in vapor form via chimneys into the environment. Stricter environmental requirements no longer permit this handling in the case of new plants. Furthermore, subsequently scrubbing the offgases formed in the melting stage is also known. However, a disadvantageously high outlay in terms of apparatus is required for cooling and separating the individual offgas components.

U.S. Pat. No. 2,520,454 A describes a process for preparing sulfuric acid, in which sulfur is vaporized and then burnt in a combustion chamber and oxidized in successive oxidation stages.

Thus a need exists for a process for preparing sulfuric acid by means of which the offgases formed in the melting stage can be treated in a simple and environmentally friendly manner, as well as an apparatus for carrying out this process.

BRIEF DESCRIPTION OF THE FIGURES

FIG. 1 is a schematic view of a flow diagram of an example apparatus for carrying out a process for preparing sulfuric acid.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a process for preparing sulfuric acid, wherein elemental sulfur is melted in a melting stage and sulfuric acid is subsequently produced from the molten sulfur. The present disclosure further relates to an apparatus for carrying out this process. Sulfuric acid is, in particular, prepared by means of the contact process or double contact process, in which the molten sulfur is firstly oxidized to sulfur dioxide and the sulfur dioxide is subsequently oxidized further to sulfur trioxide by means of a catalyst in a converter. Sulfuric acid is then produced from the sulfur trioxide. The sulfuric acid can be used first and foremost for producing phosphate-containing fertilizers.

Further, in one example, a process is disclosed for preparing sulfuric acid, wherein elemental sulfur is melted in a melting stage and sulfuric acid is subsequently produced from the molten sulfur, the sulfur-containing offgases formed in the melting stage are subjected to oxidation in a supplementary oxidation stage in which sulfur-containing components of the offgases are oxidized to sulfur dioxide and the sulfur dioxide present in the offgases is then processed further to give at least one reaction product, in particular sulfuric acid. In this respect, the present disclosure is based on the recognition that the offgases formed in the melting stage cannot only be disposed of simply and effectively within the framework of the process of the present disclosure, but can additionally be processed further to give useful reaction products. The present disclosure is additionally based on the recognition that the process is possible with an advantageous energy balance.

According to the invention, the preparation of sulfuric acid using the process of the invention is firstly carried out in a manner known per se by a contact process or double contact process. The sulfur melted in the melting stage is advantageously introduced into a first oxidation stage and there oxidized or burnt by means of oxygen or atmospheric oxygen to form sulfur dioxide. Furthermore, this sulfur dioxide is, according to the invention, subsequently introduced, preferably together with air, into a second oxidation stage configured as converter. Here, the sulfur dioxide is oxidized by recommended measures with the aid of a catalyst, in particular by means of vanadium pentoxide ($V_2O_5$) as catalyst, to sulfur trioxide ($SO_3$). For this purpose, the sulfur dioxide flows through preferably a plurality of catalyst stages or catalyst beds in the converter. At the end or at the lower end of the converter, the process gas comprising the oxidation product sulfur trioxide is advantageously taken off and fed to an absorption stage. In this absorption stage, the sulfur trioxide is then converted into sulfuric acid. For this purpose, the process gas is, according to tried-and-tested measures, formed in countercurrent to dilute sulfuric acid, for example 98.5% strength-99.5% strength sulfuric acid, with the sulfur trioxide being absorbed by the dilute sulfuric acid and the sulfuric acid being concentrated thereby.

A particularly preferred embodiment of the process of the invention is characterized in that the melting stage is operated without emissions or substantially without emissions by all offgases or nearly all offgases from the melting stage being fed to further processing or further chemical processing. Here, the invention provides for the melting stage to be operated in a gastight or substantially gastight manner. Here, gastight means, in particular, that, apart from the discharge of the offgases to be processed and apart from any gases which are introduced on introduction of the sulfur to be melted, no further introduction or discharge of gases takes place in the melting stage and that the melting stage is preferably operated with exclusion of air. The introduction of the elemental sulfur to be melted into the melting stage advantageously occurs by means of a lock device, for example using a star feeder. In this way, the melting stage can be operated without emissions and only the offgases obtained during melting of the sulfur, in particular sulfur dioxide ($SO_2$), elemental sulfur, hydrogen sulfide ($H_2S$) and water, are according to the invention fed to further processing or chemical processing. In an embodiment of the invention, at least part of these offgases, preferably all offgases or substantially all offgases, are fed to the oxidation according to the invention in the supplementary oxidation stage, so that sulfur-containing components of the offgases, mainly elemental sulfur and hydrogen sulfide, are oxidized to sulfur dioxide. Furthermore, an embodiment of the invention provides for a sufficient pressure to be generated in the melting stage or in the melting oven due to the melting of the sulfur and, in particular, due to the associated formation of water vapor to feed the offgases arising to the further processing and especially to the intermediate absorption stage described below. Here, the working pressure in the intermediate absorption stage has to be taken into account. In principle, the offgases from the melting stage or from the melting oven can also be drawn off by means of at least one blower or by means of at least one pump. In this way, subatmospheric pressure can be produced over the melt in the melting oven, so that the reliable function of the emission-free operation of the melting stage is assisted. In particular, offgases are prevented from going from the melting oven into the surroundings via small openings and gaps.

Preference is given to all offgases from the melting stage being fed to the oxidation according to the invention, so that sulfur-containing components of the offgases are oxidized to sulfur dioxide. This oxidation is advantageously carried out with the introduction of oxygen, in particular atmospheric oxygen. According to a preferred embodiment, the temperature of the offgas is for this purpose increased directly or indirectly to above the ignition temperatures of sulfur (250° C.) and of hydrogen sulfide (270° C.). After the oxidation of sulfur and hydrogen sulfide to sulfur dioxide, essentially only sulfur dioxide ($SO_2$) and the gases of water ($H_2O$) and nitrogen and oxygen from the air, which are unproblematical from an environmental point of view, are present in the offgas leaving the oxidation or the supplementary oxidation stage. According to the invention, the sulfur dioxide is processed further to form at least one reaction product. It is within the scope of the invention for the sulfur dioxide formed in the abovementioned oxidation of the sulfur-containing offgases to be at least partly, preferably completely, processed further to give sulfuric acid. It is also within the scope of the invention for the sulfur dioxide formed in this oxidation of the sulfur-containing offgases to be introduced into the second oxidation stage and there be oxidized to sulfur trioxide and for this sulfur trioxide subsequently to be converted into sulfuric acid in the absorption stage. In this context, a particularly recommended embodiment of the invention will be described below.

After the oxidation of the sulfur-containing offgas components to sulfur dioxide, the offgases are preferably introduced together with process gas from the second oxidation stage into an intermediate absorption stage. The process gas which is discharged from the second oxidation stage and is introduced into the intermediate absorption stage comprises both not yet oxidized sulfur dioxide and also sulfur trioxide formed by oxidation in the second oxidation stage. The process gas fed from the second oxidation stage into the intermediate absorption stage is advantageously discharged from a middle region of the second oxidation stage after the process gas has flowed through part, for example, half or two thirds of the second oxidation stage. According to a recommended embodiment of the invention, this $SO_3$-containing process gas from the second oxidation stage is conveyed together with the offgases from the oxidation in the intermediate absorption stage in countercurrent to sulfuric acid or dilute sulfuric acid. Here, the sulfur trioxide is absorbed from the process gas by the sulfuric acid. The water vapor present in the offgases is preferably likewise absorbed by the sulfuric acid. The sulfuric acid conveyed in countercurrent may be, for example, 98.5% strength-99.5% strength sulfuric acid. This dilute sulfuric acid is concentrated by absorption of the sulfur trioxide from the process gas and preferably at the same time diluted again by absorption of the water vapor. The water vapor from the offgases can thus be utilized for the dilution of the sulfuric acid which is necessary in any case and this ultimately leads to a saving of water in the process for the preparation of sulfuric acid. The sulfuric acid produced thereby is discharged from the intermediate absorption stage. The sulfur dioxide present in the offgases and also the sulfur dioxide still present in the process gas is advantageously fed or recirculated from the intermediate absorption stage in the second oxidation stage. There, the oxidation or the catalytic oxidation of the sulfur dioxide to sulfur trioxide takes place. According to recommended measures, the sulfur trioxide is then converted into sulfuric acid in the absorption stage (final absorption stage). For this purpose, the sulfur trioxide is preferably conveyed in countercurrent to sulfuric acid or to dilute sulfuric acid and this sulfuric acid absorbs the sulfur trioxide, so that the sulfuric acid is concentrated in a manner known per se. The concentrated sulfuric acid is advantageously diluted with water. It is therefore possible according to the invention for the sulfur dioxide originating from the offgases to be processed further to give sulfuric acid.

In a particularly preferred embodiment of the invention, the thermal energy carried by the offgases after the oxidation of the sulfur-containing components is recovered in a heat recovery device. The thermal energy can, in particular, be recovered in the form of low-pressure steam. According to a particularly recommended embodiment, the heat of the hot sulfuric acid formed in the intermediate absorption stage is recovered, specifically preferably recovered as low-pressure steam. To solve the technical problem, the invention also teaches an apparatus for preparing sulfuric acid, wherein at least one melting oven for melting elemental sulfur is provided and a first oxidation facility for oxidation of the molten sulfur to sulfur dioxide connected to the melting oven is present, at least one supplementary oxidation facility is also connected to the melting oven, into which supplementary oxidation facility offgases formed during melting of the sulfur can be introduced from the melting oven, sulfur-containing components of the offgases can be oxidized to sulfur dioxide in the supplementary oxidation facility and a second oxidation facility into which at least part of the sulfur dioxide formed in the supplementary oxidation facility can be introduced and can be oxidized to sulfur trioxide is provided.

According to the invention, the melting oven can be made emission-free or emission-tight. The melting of the elemental sulfur in the melting oven is preferably carried out with exclusion of air or with substantial exclusion of air. The sulfur to be melted is advantageously introduced into the melting oven via a lock device, for example a star feeder. During melting, the offgases formed can, especially as a result of the water vapor formed, have a sufficient pressure for conveying the offgases further to the intermediate absorption stage. However, it is also possible for at least one blower or a pump for conveying the offgases to be introduced into an offtake conduit connected to the melting oven. The offgases formed in the melting oven are then fed to the supplementary oxidation facility which can, for example, be configured in the form of a burner or an in-line burner. Here, oxidation of the sulfur-containing components of the offgases (elemental sulfur, hydrogen sulfide) to sulfur dioxide takes place.

In a particularly recommended embodiment of the invention, an intermediate absorption tower forming the intermediate absorption stage is connected to the supplementary oxidation facility, with the $SO_2$-containing offgases from the supplementary oxidation facility being able to be introduced together with process gas from the second oxidation facility into the intermediate absorption tower. In this way, $SO_2$-containing offgas from the supplementary oxidation facility is advantageously mixed with the $SO_2$- and $SO_3$-containing process gas from the second oxidation facility in the intermediate absorption tower.

A particularly recommended embodiment of the invention is characterized in that the second oxidation facility is configured as a multistage, preferably two-stage, converter, a first converter stage of the converter being connected to the intermediate absorption tower, with the proviso that process gas can, after flowing through the first converter stage, be introduced as $SO_2$- and $SO_3$-containing process gas together with the $SO_2$-containing offgases from the supplementary oxidation facility into the intermediate absorption tower. According to the invention, sulfur trioxide can be absorbed from the process gas in the intermediate absorption tower to produce sulfuric acid. As indicated above, process gas and offgases are preferably conveyed in countercurrent to sulfuric acid in the intermediate absorption tower, so that the sulfur trioxide is absorbed by the sulfuric acid and the sulfuric acid is at the same time concentrated. It is within the scope of the invention for water vapor from the $SO_2$-containing offgases at the same time to be taken up by the sulfuric acid. The gases (process gas and $SO_2$-containing offgases) are, after flowing through the intermediate absorption tower, advantageously taken off at the upper end of the intermediate absorption tower and fed to the second oxidation facility or the converter. According to a recommended embodiment, a second converter stage of the multistage or two-stage converter is connected to the intermediate absorption tower in such a way that $SO_2$-containing offgas and $SO_2$-containing process gas from the intermediate absorption tower can be introduced into the second converter stage, so that the offgases and the process gas then flow through the second converter stage and the sulfur dioxide present in the gases is oxidized to sulfur trioxide in the second converter stage.

It is advantageous for the absorption stage in the form of an absorption tower (final absorption tower) to be connected to the second oxidation facility or to the converter and for the sulfur trioxide originating from the second oxidation facility preferably to be absorbed in the absorption tower or final absorption tower. It is advisable for the sulfur trioxide originating from the second oxidation facility to be conveyed in countercurrent to sulfuric acid or to dilute sulfuric acid, for example 98.5% strength-99.5% strength, sulfuric acid, in the absorption tower, so that the sulfur trioxide is absorbed by the sulfuric acid and the sulfuric acid is concentrated as a result. It is within the scope of the invention for the concentrated sulfuric acid produced here subsequently to be diluted with water.

In a recommended embodiment of the invention, a heat recovery device is connected to the intermediate absorption tower. Thermal and chemical energy can be recovered from the offgases from the supplementary oxidation facility and/or from the absorption processes in the intermediate absorption tower by means of this heat recovery device. Advantageously, the hot sulfuric acid collected in the intermediate absorption tower is conveyed through at least one heat exchanger and the thermal and chemical energy or heat energy is preferably conveyed further or used further in the form of heated low-pressure steam.

The invention is based on the recognition that the offgases arising during melting of the elemental sulfur in the preparation of sulfuric acid do not have to be discarded but can be effectively processed further and be utilized, in particular, for the preparation of sulfuric acid. The thermal energy obtained in the offgas treatment can also be largely recovered in a simple manner. In this respect, the invention is based on the recognition that emissions arising during melting of the sulfur can be very largely utilized in terms of material and energy. The disadvantages indicated at the outset in connection with the prior art can be effectively and reliably avoided in the process of the invention. Firstly, offgases which are problematical from an environmental point of view do not have to be discharged into the surroundings but instead can be utilized in the process for preparing sulfuric acid. Furthermore, solid deposits in the form of solid sulfur resulting from the emission vapors in the process of the invention can be considerably reduced or minimized. Explosion risks associated with the emission vapors can also be largely avoided. It should be emphasized that the process of the invention can be operated comparatively simply and with little outlay and can thus also be implemented at relatively low cost.

FIG. 1 schematically shows the flow diagram of an apparatus for carrying out the process of the invention for preparing sulfuric acid. The apparatus has a melting oven 1 for melting elemental sulfur (melting stage). In a particularly preferred embodiment of the invention, this melting oven 1 is made emission-free or emission-tight. This means, in particular, that, apart from the offtake described below of the offgases from the melting oven 1, no emissions or offgases are released into the surroundings. The melting in the melting oven 1 is advantageously carried out with exclusion of air. The sulfur to be melted is preferably supplied (arrow in the FIGURE) to the melting oven 1 via a lock device which is preferably configured as a star feeder 6 as is shown in the working example.

The molten sulfur is conveyed from the melting oven 1 into a first oxidation facility 2 which is preferably configured as a burner, as shown in the working example. Here, the molten sulfur is oxidized or burnt with the aid of atmospheric oxygen so as to form sulfur dioxide ($SO_2$). The air fed to the first oxidation facility 2 (arrow in the FIGURE) is dried beforehand in a drying tower 7, for example with the aid of concentrated sulfuric acid. The sulfur dioxide formed in the first oxidation facility 2 is subsequently introduced into the second oxidation facility 5 configured as a converter.

In the second oxidation facility 5 or in the converter, the sulfur dioxide is oxidized to sulfur trioxide ($SO_3$) by means of a catalyst, preferably by means of vanadium pentoxide ($V_2O_5$). The sulfur dioxide preferably flows from the top downward through the converter, as shown in the working example. A plurality of catalyst trays 8 is provided here.

From this second oxidation facility 5 or from this converter, the sulfur trioxide or the sulfur trioxide-containing process gas is fed to an absorption stage in the form of a final absorption tower 9. In this final absorption tower 9, sulfuric acid is formed from the sulfur trioxide. For this purpose, the sulfur trioxide-containing process gas is preferably, as depicted in the working example, conveyed in countercurrent to sulfuric acid or dilute sulfuric acid, in the working example 98.5% strength-99.5% strength sulfuric acid. As a result, the sulfur trioxide is absorbed in the sulfuric acid and the sulfuric acid is at the same time concentrated. This concentrated sulfuric acid is subsequently diluted again with water, depending on requirements and the desired dilution.

The converter forming the second oxidation facility 5 is preferably configured as two-stage converter, as shown in the working example. According to recommended measures and as shown in the working example, process gas is, after passing through the first converter stage 10 with the catalyst trays 8 arranged there, introduced as $SO_2$- and $SO_3$-containing process gas from the first converter stage 10 into the intermediate absorption stage configured as intermediate absorption tower 11. The process gas is preferably, as in the working example, introduced from below into the intermediate absorption tower 11 and conveyed in countercurrent to dilute sulfuric acid, for example 98.5% strength-99.5% strength sulfuric acid. In this way, sulfur trioxide is absorbed from the process gas into the sulfuric acid and the sulfuric acid is concentrated. At the upper end of the intermediate absorption tower 11, the process gas or the sulfur dioxide-containing process gas is advantageously recirculated into the converter, namely into the second converter stage 12 with its catalyst trays 8 arranged below the first converter stage 10 in the working example. The sulfur dioxide present in the process gas is catalytically oxidized to sulfur trioxide in the second converter stage 12 and the sulfur trioxide is then, as described above, taken off at the lower end of the converter and introduced into the final absorption tower 9.

According to the invention, the sulfur-containing offgases formed in the melting stage or in the melting oven 1 during melting are subjected to oxidation. For this purpose, these offgases are, in the working example, taken off via the offtake conduit 3 from the melting oven 1 and fed into the supplementary oxidation facility 4. The supplementary oxidation facility 4 preferably has, as shown in the working example, a burner which is supplied with fuel, e.g. natural gas, (arrow in the FIGURE) and the elemental sulfur (S) present in the offgas and also the hydrogen sulfide ($H_2S$) present in the offgas are oxidized to sulfur dioxide with the aid of atmospheric oxygen in this supplementary oxidation facility 4. In the working example as shown in the FIGURE, a blower 13 by means of which the offgases can be fed to the supplementary oxidation facility 4 is provided. It is also possible for a sufficiently high pressure to be built up in the melting oven 1, especially as a result of the water vapor present in the offgas, so that such a blower 13 is not necessary. The water vapor present in the offgases arises particularly when, according to one variant, the sulfur introduced into the melting oven 1 has been moistened for safety reasons. The offgases leaving the melting oven 1 contain first and foremost sulfur dioxide ($SO_2$), elemental sulfur (S), hydrogen sulfide ($H_2S$) and water vapor ($H_2O$). After oxidation of the sulfur-containing offgas components S and $H_2S$ in the supplementary oxidation facility 4, the offgases comprise essentially sulfur dioxide ($SO_2$) and water ($H_2O$) in addition to nitrogen and oxygen.

The sulfur dioxide-containing offgases exiting from the supplementary oxidation facility 4 are, according to recommended measures and as shown in the working example, introduced together with the process gas from the first converter stage 10 into the intermediate absorption tower 11. The sulfur dioxide-containing offgas is thus conveyed with the process gas in countercurrent to the abovementioned sulfuric acid. As a result, the water vapor present in the offgases is absorbed by the sulfuric acid, so that the concentrating effect of the sulfur trioxide on the sulfuric acid is partially compensated for by the water taken up. In this way, water required for dilution of the concentrated sulfuric acid collecting at the lower end of the intermediate absorption tower 11 can be saved.

A particular aspect of the process of the invention is the preferred recovery of the thermal and chemical energy arising in the process. For this purpose, a heat recovery device 14 is preferably, and as shown in the working example, connected to the lower end of the intermediate absorption tower. The hot concentrated sulfuric acid can be taken from the bottom of the intermediate absorption tower and fed to the heat recovery device 14 where heat can be transferred to water or steam, so that the thermal and chemical energy can preferably be conveyed and utilized further in the form of low-pressure steam.

What is claimed is:

1. A process for preparing sulfuric acid, the process comprising:
   melting elemental sulfur in a melting stage to give molten sulfur;
   producing sulfuric acid from the molten sulfur;
   subjecting offgases formed in the melting stage to oxidation in a supplementary oxidation stage in which sulfur-containing components of the offgases are oxidized to sulfur dioxide and the sulfur dioxide is processed to give a reaction product;
   oxidizing the molten sulfur to sulfur dioxide in a first oxidation stage, oxidizing the sulfur dioxide from the first oxidation stage to sulfur trioxide in a second oxidation stage, and converting the sulfur trioxide into sulfuric acid in an absorption stage;
   introducing the offgases after oxidation of the sulfur-containing offgas components together with process gas from the second oxidation stage into an intermediate absorption stage; and
   feeding sulfur dioxide from the offgases or from the process gas from the intermediate absorption stage into the second oxidation stage.

2. The process of claim 1 wherein the melting stage is operated without emissions by processing all offgases from the melting stage, wherein the offgases that are subjected to oxidation in the supplementary oxidation stage form at least a portion of all offgases from the melting stage.

3. The process of claim 1 wherein the melting stage is operated in a gastight manner.

4. The process of claim 1 comprising at least partly processing the sulfur dioxide in the offgases to give sulfuric acid.

5. The process of claim 1 comprising introducing the sulfur dioxide from the offgases into the second oxidation stage to be oxidized to sulfur trioxide, wherein the sulfur trioxide is then converted into sulfuric acid in the absorption stage.

6. The process of claim 1 comprising conveying the offgases and the process gas from the second oxidation stage countercurrent to sulfuric acid in the intermediate absorption stage so that sulfur trioxide is absorbed from the process gas by the sulfuric acid.

7. The process of claim 1 comprising recovering thermal energy carried by the offgases after the oxidation in a heat recovery device.

8. An apparatus for preparing sulfuric acid, the apparatus comprising:
- a melting oven for melting elemental sulfur;
- a first oxidation facility that is connected to the melting oven, wherein the first oxidation facility is configured to oxidize molten sulfur to sulfur dioxide;
- a second oxidation facility configured to oxidize the sulfur dioxide from the first oxidation facility to sulfur trioxide; and
- a supplementary oxidation facility connected to the melting oven, wherein offgases formed while melting the elemental sulfur are configured to be taken off from the melting oven and at least partly fed to the supplementary oxidation facility, wherein the supplementary oxidation facility is configured to oxidize sulfur-containing components of the offgases to sulfur dioxide,
- wherein the second oxidation facility is configured to oxidize the sulfur dioxide from the supplementary oxidation facility to sulfur trioxide.

9. The apparatus of claim 8 wherein the melting oven is emission-free.

10. The apparatus of claim 8 comprising an intermediate absorption tower, which forms an intermediate absorption stage, connected to the supplementary oxidation facility, wherein the sulfur dioxide-containing offgases from the supplementary oxidation facility together with the process gas from the second oxidation facility are introduced into the intermediate absorption tower.

11. The apparatus of claim 10 comprising a heat recovery device connected to the intermediate absorption tower, wherein the heat recovery device recovers thermal and chemical energy from the offgases.

12. The apparatus of claim 10 wherein the second oxidation facility is configured as a multistage converter, with a first converter stage of the multistage converter being connected to the intermediate absorption tower such that process gas, after flowing through the first converter stage, is introduced together with the sulfur dioxide-containing offgases from the supplementary oxidation facility into the intermediate absorption tower.

13. The apparatus of claim 12 wherein a second multistage converter of the multistage converter is connected to the intermediate absorption tower such that offgases and process gas from the intermediate absorption tower is introduced into the second converter stage.

14. The apparatus of claim 8 wherein an absorption stage configured as an absorption tower is connected to the second oxidation facility, wherein sulfur trioxide coming from the second oxidation facility is absorbed in the absorption tower.

* * * * *